3,130,027
CONTROL SYSTEM FOR FLUID SEPARATION
Ernest A. Harper, Bartlesville, Okla., assignor to Phillips Petroleum Company, a corporation of Delaware
Filed Aug. 23, 1962, Ser. No. 218,986
9 Claims. (Cl. 62—21)

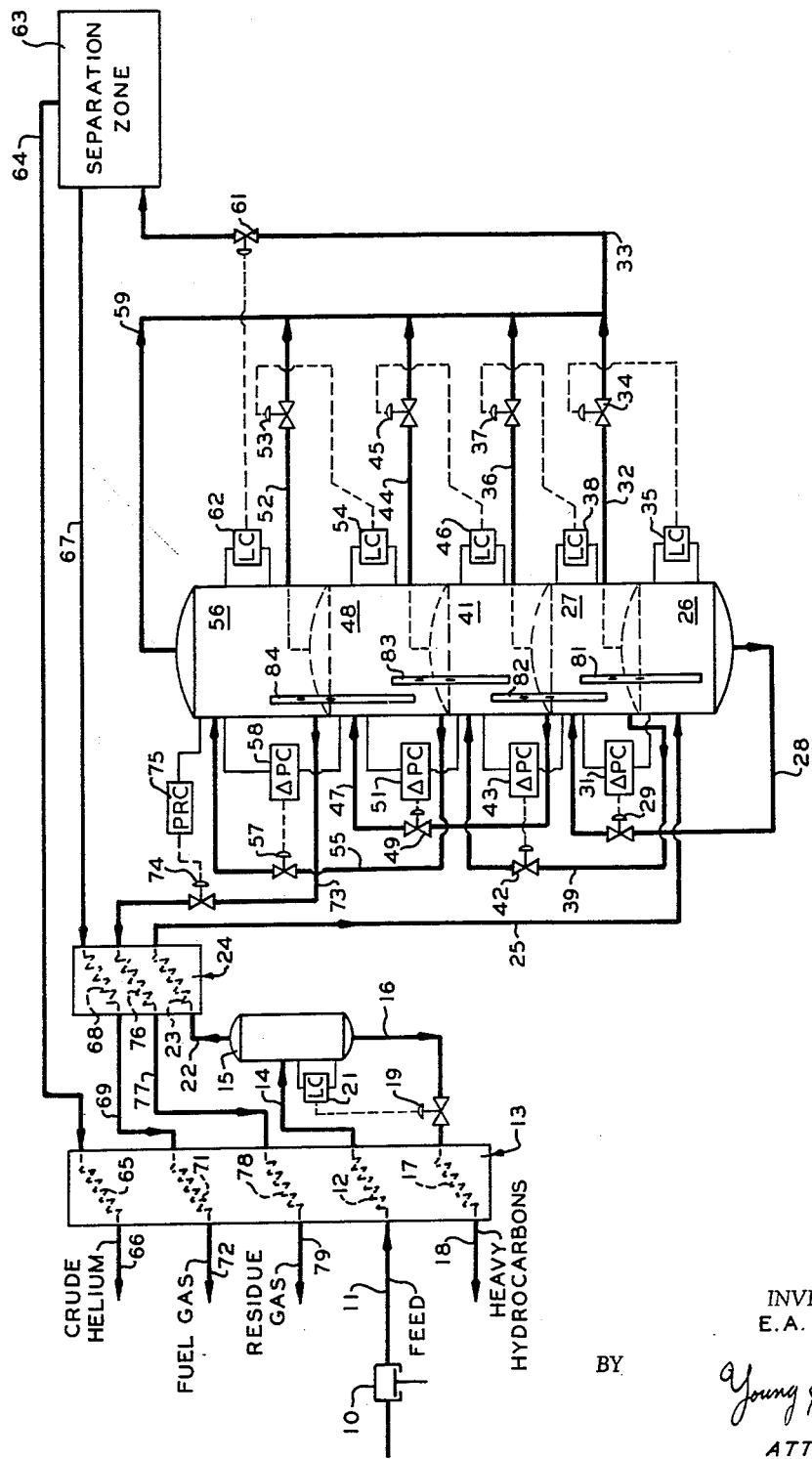

This invention relates to method and apparatus for separating gases. In one aspect the invention relates to method and apparatus for the recovery of helium from a helium-containing gas. In a further aspect the invention relates to a control system for utilization in the recovery of helium from natural gas. In a still further aspect the invention relates to method and apparatus for controlling the separation of gases.

The value of helium as an inert atmosphere, a component of an artificial breathing medium, a lifting gas, and other diverse uses has been known. The world supply of naturally-available helium is limited to very few geographical locations, most of which are within the continental United States, and is further limited so far as is presently known as being a minor constituent of natural gas. Various efforts have been made in the past to recover the helium from such a gas mixture economically, and have met with greater or lesser success.

When the constituents of a liquid are separated by flash distillation, a more distinct separation is obtained if the liquid is flashed in stages. However it is difficult to control the flow of liquid from one stage to another and to remove the vapor from each stage without overloading the compressors which compress the vapors. In the past it has been proposed to utilize a liquid level controller to regulate the rate of withdrawal of liquid from a phase separator and to utilize a pressure controller to regulate the rate of withdrawal of vapor from the phase separator to thereby maintain the phase separator under the desired equilibrium conditions. While such a control system is generally satisfactory where the process is not subject to a wide variation in operating conditions, this system of controls does not perform satisfactorily under abnormal operating conditions such as start-up operations and failure of other controls in the process. The problem becomes acute when the liquid withdrawn from the phase separator is passed in heat exchanging relationship with the incoming feed to aid in cooling the feed to condense a portion thereof. For example under a condition which results in an excessive drop in liquid level in the phase separator, the control system would function by closing the valve in the liquid withdrawal line, resulting in an increase in pressure in the phase separator, thereby causing the pressure controller to open the valve in the vapor withdrawal line even wider. The reduction or elimination of the withdrawal of liquid from the phase separator results in less heat being removed from the incoming feed, causing the ratio of vapor to liquid in the feed entering the phase separator to increase even farther. The occurrence of such an abnormal condition can result in the complete shut down of a process utilizing such a control system.

In accordance with the present invention it has been discovered that these difficulties can be overcome by utilizing a plurality of phase separators in series with the liquid withdrawn from each phase separator, other than the last phase separator, being introduced into the next phase separator in the series at a rate controlled responsive to the differential pressure between the two respective phase separators, while the vapors are withdrawn from each phase separator at a rate controlled responsive to the liquid level in the respective phase separator. In a presently preferred embodiment the vapor streams are combined, with each individual stream, other than the stream from the last phase separator, being controlled responsive to the liquid level in the respective phase separator, and the combined stream flow rate is controlled responsive to the liquid level in said last phase separator.

Accordingly, it is an object of this invention to provide a method and apparatus for separating a gas mixture. It is another object of this invention to provide economical method and apparatus for recovering helium from a gas mixture containing helium. It is a further object of the invention to provide improved method and apparatus for the recovery of various constituents from natural gas, such as natural gas liquids, helium, and nitrogen. It is a further object of this invention to provide method and apparatus for the separation of various constituents of natural gas without requiring external refrigeration. Yet another object of the invention is to provide an improved control system for utilization in the recovery of one or more components from natural gas. A still further object of the invention is to provide a new control system for the recovery of helium from natural gas. Another object of the invention is to provide method and apparatus for controlling a process for separating a gas mixture.

Other aspects, objects and advantages of the invention will be apparent from a study of the disclosure, the drawing and the appended claims to the invention.

Referring now to the drawing there is shown a diagrammatic representation of a helium recovery system utilizing the present invention. A feed stream comprising helium, nitrogen and $C_1$ to $C_5$ hydrocarbons is compressed in compressor 10 and passed through line 11 into and through flow path 12 of heat exchanger 13 wherein the feed stream is substantially cooled. The thus cooled feed stream is passed through line 14 into phase separator 15. The condensed liquid which is predominantly $C_1$ to $C_5$ hydrocarbons with a small amount of nitrogen, is withdrawn from phase separator 15 by way of line 16 and passed into and through flow path 17 of heat exchanger 13 in heat exchanging relationship with additional feed in line 11 to recover the refrigeration power contained in the condensed liquid. The heated fluid leaving flow path 17 is withdrawn from the process by way of line 18 as a rich gas. The rate of flow through line 16 can be controlled to maintain the liquid level in separator 15 substantially constant by means of valve 19 which is actuated by liquid level controller 21 responsive to the liquid level in separator 15. The vapors, which comprise substantially all of the helium and the major portion of the nitrogen contained in the feed stream with the remainder being primarily $C_1$ hydrocarbons with a small amount of $C_2$ to $C_4$ hydrocarbons, are withdrawn from separator 15 by way of line 22 and passed into and through flow path 23 of heat exchanger 24, wherein the vapors are further cooled. The thus cooled vapors are passed by way of line 25 into phase separator 26. The condensed liquid is withdrawn from phase separator 26 and introduced into phase separator 27 by way of line 28 at a rate responsive to the differential pressure between phase separators 26 and 27 by means of valve 29 which is actuated by differential pressure controller 31. The vapors are withdrawn from phase separator 26 and passed by way of line 32 into line 33 at a rate responsive to the liquid level in phase separator 26 by means of valve 34 which is actuated by liquid level controller 35. The vapors which are flashed in phase separator 27 are withdrawn therefrom and passed by way of line 36 into line 33 at a rate responsive to the liquid level in phase separator 27 by means of valve 37 which is actuated by liquid level controller 38. Liquid is withdrawn from phase separator 27 and passed by way of line 39 into phase separator 41 at a rate responsive to the differential pressure between phase separator 27 and phase separator 41 by means of valve 42 which is actuated by differential pressure controller 43. The vapors which are flashed in phase separator 41 are withdrawn therefrom and passed by way of line 44 into line 33 at a rate responsive to the liquid level in phase separator 41 by means of valve 45 which is actuated by liquid level controller 46.

Liquid is withdrawn from phase separator 41 and passed by way of line 47 into phase separator 48 at a rate responsive to the differential pressure between phase separator 41 and phase separator 48 by means of valve 49 which is actuated by differential pressure controller 51. The vapors flashed in phase separator 48 are withdrawn therefrom and passed by way of line 52 into line 33 at a rate responsive to the liquid level in phase separator 48 by means of valve 53 which is actuated by liquid level controller 54. Liquid is withdrawn from phase separator 48 and passed by way of line 55 into phase separator 56 at a rate responsive to the differential pressure between phase separator 48 and phase separator 56 by means of valve 57 which is actuated by differential pressure controller 58. The vapors flashed in phase separator 56 are withdrawn therefrom and passed by way of line 59 into line 33. While it is within the contemplation of the invention to control the rate of flow of vapors through line 59 directly responsive to the liquid level in phase separator 56, it is presently preferred to control the total flow of vapors through line 33 responsive to the liquid level in phase separator 56 by means of valve 61 which is actuated by liquid level controller 62. The vapors passing through line 33 and valve 61 are introduced into separation zone 63 for further separation. A crude helium stream is recovered in separation zone 63 and passed by way of line 64 into and through flow path 65 of heat exchanger 13 to recover the cooling power contained in the crude helium stream, and is removed from the process by way of line 66. A fuel gas stream is also recovered in separation zone 63 and passed by way of line 67 into and through flow path 68 of heat exchanger 24 and then by way of line 69 into and through flow path 71 of heat exchanger 13 and is withdrawn from the process by way of line 72.

Liquid is withdrawn from phase separator 56 by way of line 73 at a rate responsive to the pressure in phase separator 56 by means of valve 74 which is actuated by pressure recorder controller 75. The liquid in line 73 is passed into and through flow path 76 in heat exchanger 24 and then through line 77 into and through flow path 78 in heat exchanger 13 wherein it is vaporized to recover the cooling power. The vaporized effluent from flow path 78 is withdrawn from the process by way of line 79.

In a presently preferred embodiment phase separators 26, 27, 41, 48 and 56 are constructed in the form of a single column, and restricted pipes 81, 82, 83 and 84 are provided in communication between the liquid section of separators 26, 27, 41 and 48 with the vapor section of separators 27, 41, 48 and 56, respectively. Pipes 81, 82, 83 and 84 are restricted so that about thirty percent of the liquid which is passed from one stage to another goes through the respective pipe. Pipes 81, 82, 83 and 84 are provided to prevent the buildup in one of the upper chambers of a higher pressure than the next lower chamber as the walls between the chambers are designed to have their maximum strength in the direction of a greater pressure in each chamber than the pressure in the next higher chamber.

When operating with a control system in accordance with the present invention, the flow of liquid from stage to stage will be adequate even in the event of system upsets to keep from overloading the compressor 10. Thus when the liquid level increases above the predetermined desired value, the valve in the corresponding vapor withdrawal line closes a corresponding amount, causing an increase in pressure in the phase separator, resulting in an increase in differential pressure between that phase separator and next phase separator in the series, which in turn causes the valve in the liquid withdrawal line for the particular phase separator to be opened further, thus resulting in an increase in liquid withdrawal rate and a drop in liquid level. This increase in the pressure in the phase separator provides a greater driving force to cause liquid to flow faster into the next phase separator. When the liquid level in a particular phase separator drops below a predetermined desired value, the valve in the corresponding vapor withdrawal line opens further, the differential pressure decreases, the valve in the corresponding liquid withdrawal line is closed further, thus decreasing liquid withdrawal rate, resulting in an increase in liquid level.

Phase separator 15 is described with a conventional liquid level controller 21 on the liquid withdrawal line 16, as the amount of liquid removed in separator 15 is small and the system downstream of separator 15 is capable of handling the extra amount if the control system fails. However it is within the contemplation of the invention to control the liquid withdrawal rate from separator 15 responsive to the pressure in separator 15 where the amount of liquid removed therein is larger than the remainder of the system can accept under overload conditions.

The following example is presented in further illustration of the invention but is not to be construed unduly in limitation thereof.

EXAMPLE I

A system in accordance with the drawing for the recovery of helium, a fuel gas, a residue gas, and heavy hydrocarbons is operated under the conditions and with the results set forth in the following tables.

*Table I*

| Stream | Phase | He | $N_2$ | $C_1$ | $C_2$ | $C_3$ | $C_4$ | $C_5$ | Pressure, p.s.i.g. | Temperature, °F. | Flow Rate, Mol/Hr. | Molecular Weight |
|---|---|---|---|---|---|---|---|---|---|---|---|---|
| 11 | V | .623 | 12.037 | 74.260 | 6.514 | 4.184 | 1.654 | .728 | 350 | +90 | 100 | 20.60 |
| 14 | V | .62268 | 11.93487 | 70.94326 | 3.86041 | .85602 | .04791 | ------ | 345 | −82.9 | 88.26515 | 18.48 |
| 14 | L | .00032 | .10213 | 3.31674 | 2.65359 | 3.32798 | 1.60609 | .728 | 345 | −82.9 | 11.73485 | 36.49 |
| 16 [1] | V | .00032 | .10019 | 3.306587 | .54411 | .05956 | ------ | ------ | 30 | −124.7 | 3.77005 | 18.83 |
| 16 [1] | L | -------- | .00194 | .25087 | 2.10948 | 3.26842 | 1.60609 | .728 | 30 | −124.7 | 7.9648 | 44.85 |
| 18 | V | .00032 | .10213 | 3.31674 | 2.65359 | 3.32798 | 1.60609 | .728 | 20 | +80 | 11.73485 | 36.49 |
| 22 | V | .62268 | 11.93487 | 70.94326 | 3.86041 | .85602 | .04791 | ------ | 345 | −82.9 | 88.26515 | 18.48 |
| 25 | V | .48813 | 1.70768 | 2.10111 | .00294 | .00005 | ------ | ------ | 335 | −186.8 | 4.29991 | 19.44 |
| 25 | L | .13455 | 10.22719 | 68.84215 | 3.85747 | .85597 | .04791 | ------ | 335 | −186.8 | 83.96524 | 18.43 |
| 33 | V | .62168 | 4.60631 | 5.60791 | .01074 | .00013 | ------ | ------ | 235 | −193.9 | 10.84677 | 20.45 |
| 64 | V | .62164 | .49018 | .00856 | ------ | ------ | ------ | ------ | 386 | −250 | 1.12038 | 14.60 |
| 66 | V | .62164 | .49018 | .00856 | ------ | ------ | ------ | ------ | 380 | +80 | 1.12038 | 14.60 |
| 67 | V | .00002 | 4.04740 | 5.59810 | .01074 | .00013 | ------ | ------ | 75 | −206 | 9.65639 | --------- |
| 69 | V | .00002 | 4.04740 | 5.59810 | .01074 | .00013 | ------ | ------ | 73 | −110 | 9.65639 | --------- |
| 72 | V | .00002 | 4.04740 | 5.59810 | .01074 | .00013 | ------ | ------ | 70 | +80 | 9.65639 | --------- |
| 73 | L | .00100 | 7.32856 | 65.33535 | 3.84967 | .85589 | .04791 | ------ | 235 | −193.9 | 77.41838 | 18.21 |
| 77 | V | .00100 | 7.32856 | 65.33535 | 3.84967 | .85589 | .04791 | ------ | 227 | −92.2 | 77.14838 | 18.21 |
| 79 | V | .00100 | 7.32856 | 65.33534 | 3.94967 | .85589 | .04791 | ------ | 219 | +80 | 77.41838 | 18.21 |

[1] Downstream of valve 19.

Table II

| Phase Separation Zone | Temperature, °F. | Pressure, p.s.i.g. |
| --- | --- | --- |
| 26 | −186.8 | 335 |
| 27 | −188.6 | 310 |
| 41 | −190.4 | 285 |
| 48 | −192.1 | 260 |
| 56 | −193.9 | 235 |

As noted above, the drawing is merely diagrammatic and is not intended to fully show all component parts of the equipment which one skilled in the art will routinely design for the operation. Indeed, the showing of an element or piece of equipment does not mean that all such or similar pieces of equipment which may or can be designed by one skilled in the art in possession of this disclosure cannot be utilized as substitution therefor, likewise, the omission of an element which one skilled in the art may include in an actual unit does not mean that such a piece of equipment is intended to be omitted simply because it does not appear in the drawing. Suffice to say, the drawing is for illustrative purposes, as is the description thereof.

Reasonable variation and modification are possible within the scope of the foregoing disclosure, the drawing and the appended claims to the invention.

I claim:

1. A process for separating a component from a mixture containing said component comprising cooling said mixture, introducing the thus cooled mixture into a first separation zone, withdrawing liquid from said first separation zone, introducing the thus withdrawn liquid into a second separation zone at a rate responsive to the difference in pressure between said first and second separation zones, withdrawing vapor from said first separation zone at a rate responsive to the liquid level in said first separation zone, withdrawing vapor from said second separation zone at a rate responsive to the liquid level in said second separation zone, and withdrawing liquid from said second separation zone responsive to the pressure in said second separation zone.

2. A process for separating a component from a mixture containing said component comprising cooling said mixture to condense a portion thereof; introducing the thus cooled mixture into the first one of a plurality of separation zones which are arrayed in series; withdrawing liquid from each of said plurality of separation zones, other than the last one of said plurality of separation zones, and introducing the thus withdrawn liquid into the next one of said plurality of separation zones responsive to the differential pressure between the separation zone from which the liquid is withdrawn and the separation zone into which the thus withdrawn liquid is introduced; removing liquid from said last one of said plurality of separation zones responsive to the pressure in said last one of said plurality of separation zones, and passing the thus removed liquid into heat exchanging relationship with additional mixture to thereby cool said additional mixture; withdrawing vapors from each of said plurality of separation zones at a rate responsive to the liquid level in the respective separation zone; and passing the thus withdrawn vapors into heat exchanging relationship with said additional mixture to aid in cooling said additional mixture; each of said plurality of separation zones being maintained at a lower pressure and a lower temperature than the preceding one of said plurality of separation zones when considered in the order of said first one to said last one.

3. A process in accordance with claim 2 wherein said thus withdrawn vapors are combined and subjected to further separation procedures before being passed in heat exchanging relationship with said additional mixture.

4. A process for obtaining a helium concentrate stream from a natural gas containing helium which comprises cooling said natural gas in a first heat exchange zone to condense a portion of the heavy hydrocarbons contained in said natural gas; separating the resulting liquid from the thus cooled natural gas; passing the remaining gases through a second heat exchange zone to further cool said remaining gases; introducing the thus further cooled gases into the first one of a plurality of separation zones which are arrayed in series; withdrawing liquid from each of said plurality of separation zones, other than the last one of said plurality of separation zones, and introducing the thus withdrawn liquid into the next one of said plurality of separation zones responsive to the differential pressure between the separation zone from which the liquid is withdrawn and the separation zone into which the thus withdrawn liquid is introduced; removing liquid from said last one of said plurality of separation zones responsive to the pressure in said last one of said plurality of separation zones, and passing the thus removed liquid into heat exchanging relationship with additional natural gas in said first and second heat exchange zones to thereby cool said additional natural gas; withdrawing vapors from each of said plurality of separation zones at a rate responsive to the liquid level in the respective separation zone; and passing the thus withdrawn vapors into heat exchanging relationship with said additional natural gas in said first and second heat exchange zones to aid in cooling said additional natural gas; each of said plurality of separation zones being maintained at a lower pressure and a lower temperature than the preceding one of said plurality of separation zones when considered in the order of said first one to said last one.

5. A process in accordance with claim 4 wherein said thus withdrawn vapors are combined and then separated into a helium concentrate stream and a fuel gas stream before being passed in heat exchanging relationship with said additional natural gas.

6. A process in accordance with claim 5 wherein the rate of withdrawal of vapors from said last one of said plurality of separation zones is controlled by manipulating the rate of flow of the stream of combined vapors responsive to the liquid level in said last one of said plurality of separation zones.

7. Apparatus for separating a component of a mixture containing said component comprising means for cooling said mixture to condense a portion thereof; a plurality of phase separators arrayed in series; means for introducing the thus cooled mixture into the first one of said plurality of phase separators; means associated with each of said phase separators for withdrawing liquid therefrom; means for introducing the thus withdrawn liquid from each of said phase separators other than the last one of said phase separators in said series into the next one of said plurality of said phase separators in said series at a rate reponsive to the differential pressure between the phase separator from which the liquid is withdrawn and the phase separator into which the thus withdrawn liquid is introduced; means for passing the withdrawn liquid from said last one of said plurality of said phase separators into indirect heat exchanging relationship with an additional portion of said mixture at a rate responsive to the pressure in said last one of said plurality of said phase separators; and means connected to each of said plurality of phase separators for withdrawing vapors from each of said plurality of said phase separators at a rate responsive to the liquid level in the respective phase separator.

8. Apparatus in accordance with claim 7 further comprising means for combining the vapors withdrawn from each of said plurality of phase separators and means for passing the thus combined vapors into indirect heat exchanging relationship with an additional portion of said mixture.

9. Apparatus for obtaining a helium concentrate stream from a natural gas containing helium which comprises a first indirect heat exchanger, means for passing said natural gas through said first heat exchanger, a plurality of phase separators arrayed in series; means for introducing into the first one in the series of said plurality of phase separators the cooled natural gas from said first heat exchanger, means associated with each of said plurality of phase separators to withdraw liquid therefrom, means for passing the liquid withdrawn from each of said plurality of said phase separators other than the last one in the series of said phase separators to the next phase separator in said series at a rate responsive to the differential pressure between the phase separator from which the liquid is withdrawn and the phase separator into which the liquid is introduced, means for passing the liquid withdrawn from said last one in the series of said phase separators in indirect heat exchanging relationship with an additional portion of said natural gas in said first heat exchanger at a rate responsive to the pressure in said last one in a series of said plurality of phase separators, means associated with each of said plurality of phase separators for withdrawing vapors therefrom, means for controlling the rate of withdrawal of vapors from each of said plurality of phase separators other than the last one of said phase separators at a rate responsive to the liquid level in the respective phase separator, means for combining the thus withdrawn vapors, means for controlling the rate of flow of the thus combined vapors responsive to the liquid level in said last one of said plurality of phase separators, means for separating said combined vapors into a crude helium stream and a fuel gas stream, means for passing said crude helium stream and the said fuel gas stream through said first heat exchanger in indirect heat exchanging relationship with additional natural gas.

References Cited in the file of this patent

UNITED STATES PATENTS

| | | |
|---|---|---|
| 1,664,412 | Haynes | Apr. 3, 1928 |
| 2,389,244 | Whaley | Nov. 20, 1945 |
| 2,606,863 | Rehbein | Aug. 12, 1952 |
| 2,743,998 | Swart | May 1, 1956 |
| 2,786,703 | Parks | Oct. 30, 1956 |
| 2,882,693 | Clay | Apr. 21, 1959 |
| 3,026,682 | Palazzo et al. | Mar. 27, 1962 |
| 3,034,307 | Berger | May 15, 1962 |
| 3,073,130 | Becker | Jan. 15, 1963 |